Figure 1:
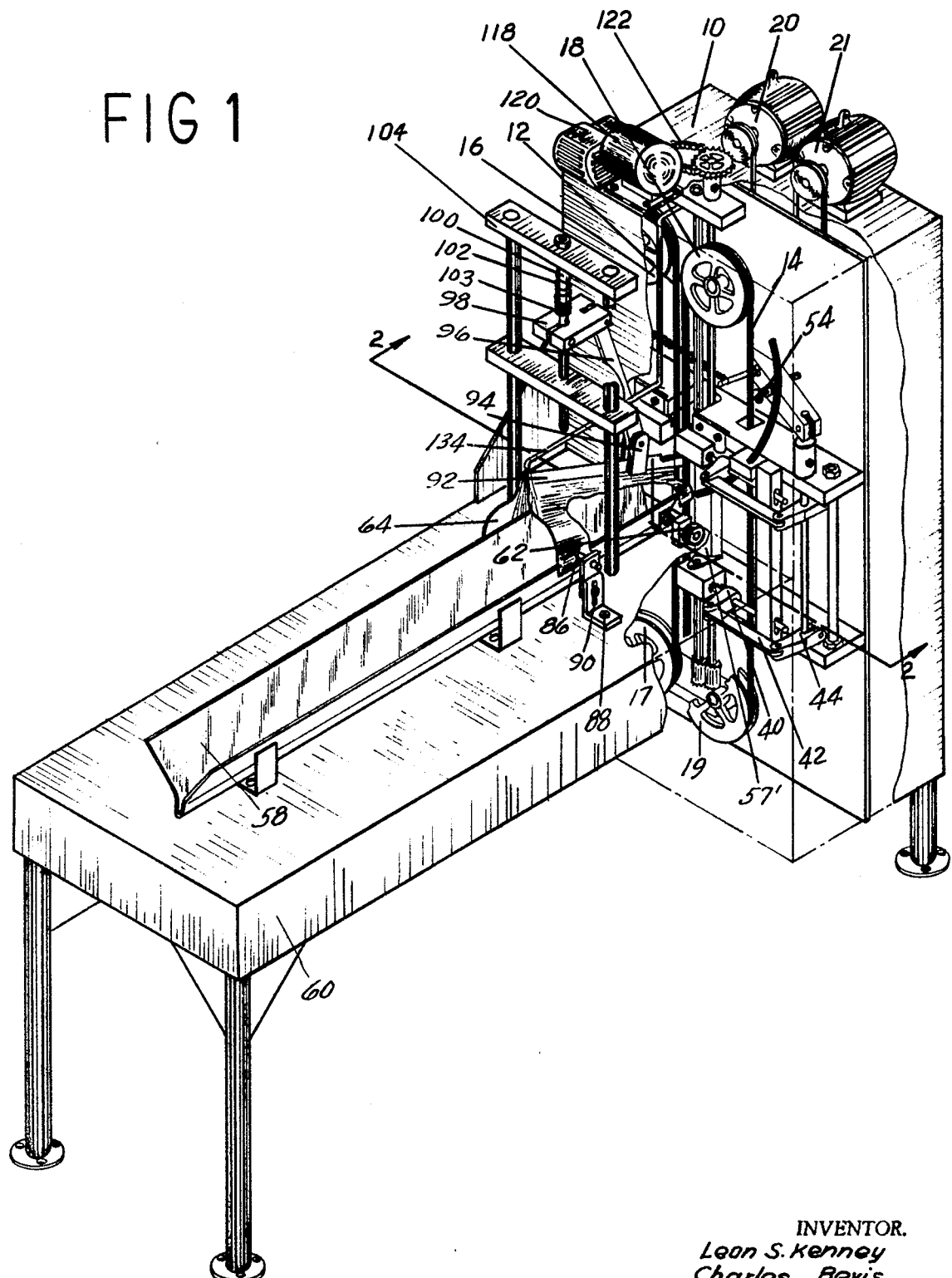

United States Patent

[11] 3,596,308

| [72] | Inventors | Leon S. Kenney<br>465 22nd Ave. S.E., St. Petersburg, Fla. 33705;<br>Charles Bevis, 2902 Terry Road, Tallahassee, Fla. 32303; Wiley J. Daniels, Rte. 9, Box 634, Tallahassee, Fla. 32301 |
|---|---|---|
| [21] | Appl. No. | 823,721 |
| [22] | Filed | May 12, 1969 |
| [45] | Patented | Aug. 3, 1971 |

[54] FISH-FILLETING APPARATUS
10 Claims, 9 Drawing Figs.

[52] U.S. Cl. .................................................. 17/56, 17/52
[51] Int. Cl. .................................................. A22c 25/16
[50] Field of Search .................................................. 17/56, 52

[56] References Cited
UNITED STATES PATENTS

| 1,728,254 | 9/1929 | Rieske | 17/56 |
| 1,754,157 | 4/1930 | Gallison | 17/56 |
| 1,883,822 | 10/1932 | Reid et al. | 17/56 |
| 2,738,544 | 3/1956 | Stevenson et al. | 17/56 |

*Primary Examiner*—Lucie H. Laudenslager
*Attorney*—Stefan M. Stein

ABSTRACT: A fish-filleting apparatus comprising two oppositely rotating bandsaw blades that are adjustable to conform to the bony skeleton of a fish whereby fish fillets are cut with minimum flesh loss as the fish passes between the blades. The fish is uniquely aligned to be centered to the blades and is held rigidly while being filleted to prevent it from twisting.

PATENTED AUG 3 1971

3,596,308

SHEET 1 OF 5

INVENTOR.
Leon S. Kenney
Charles Bevis
BY Wiley J. Daniels

Stefan M. Stein
Attorney

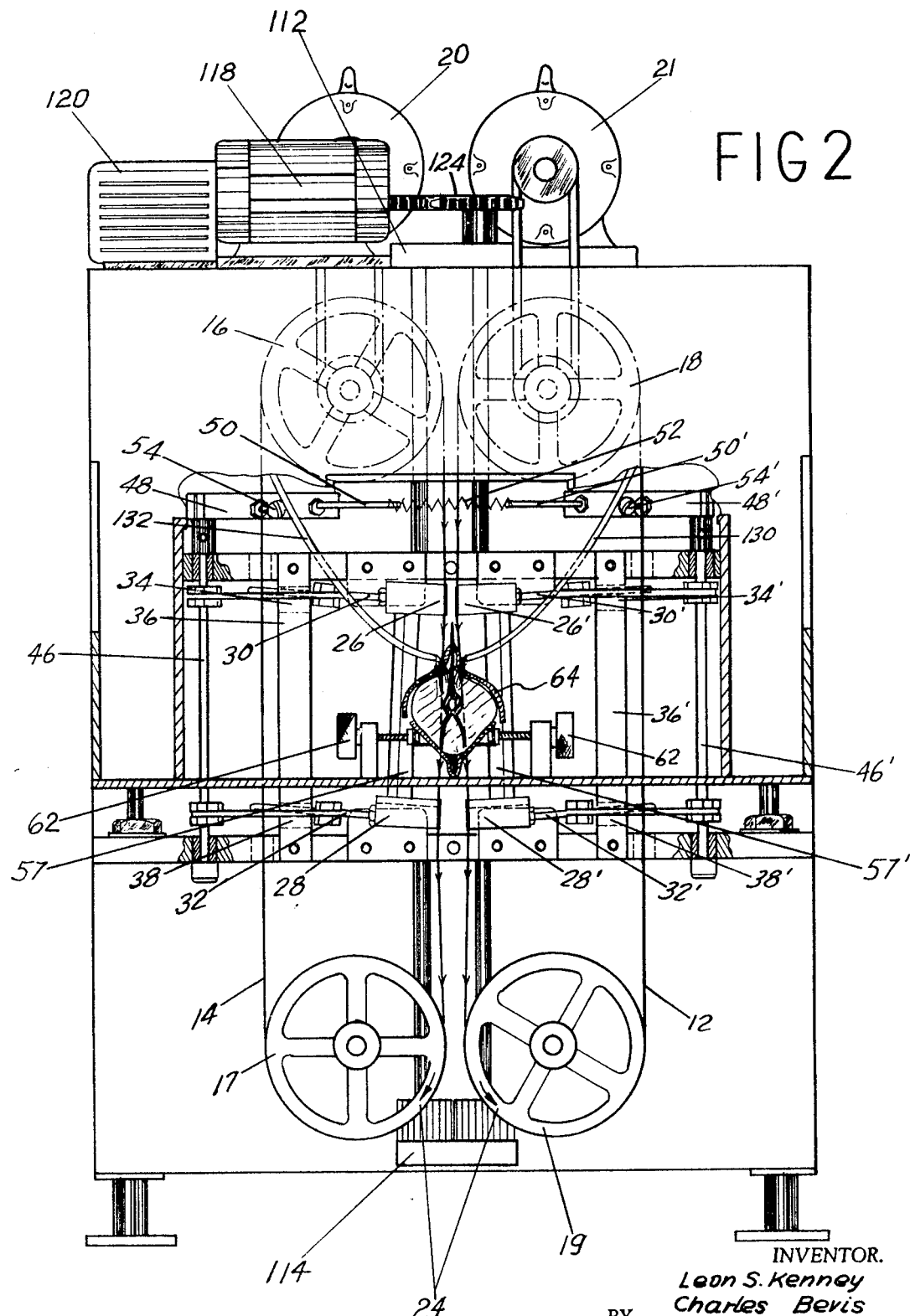

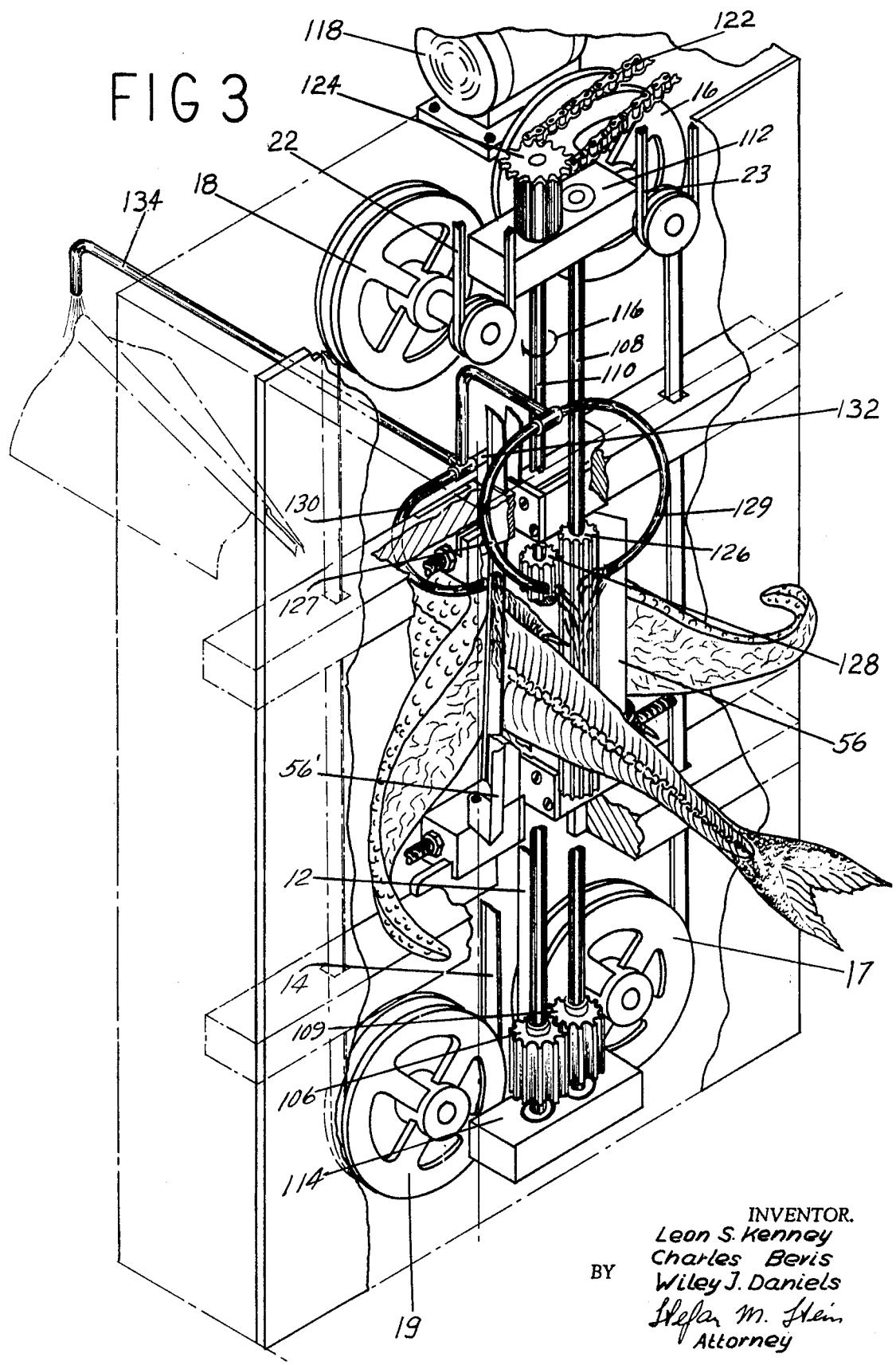

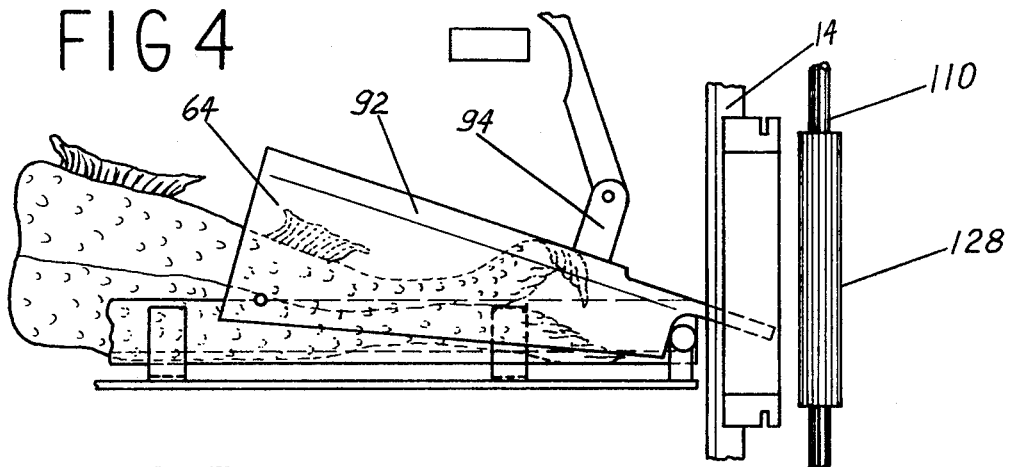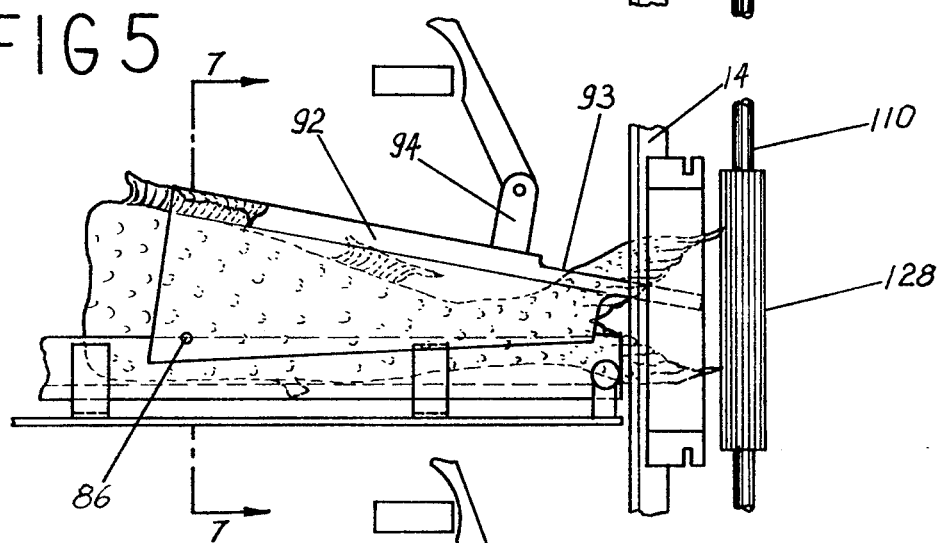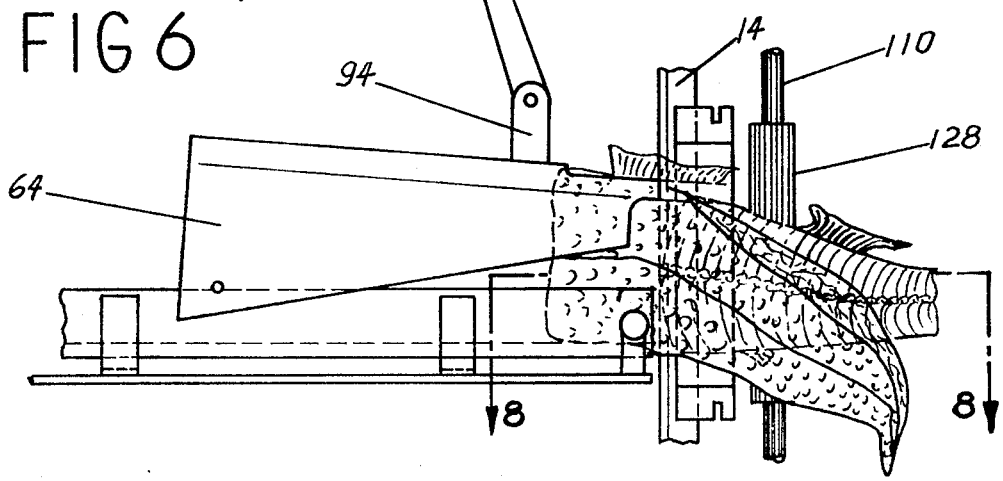

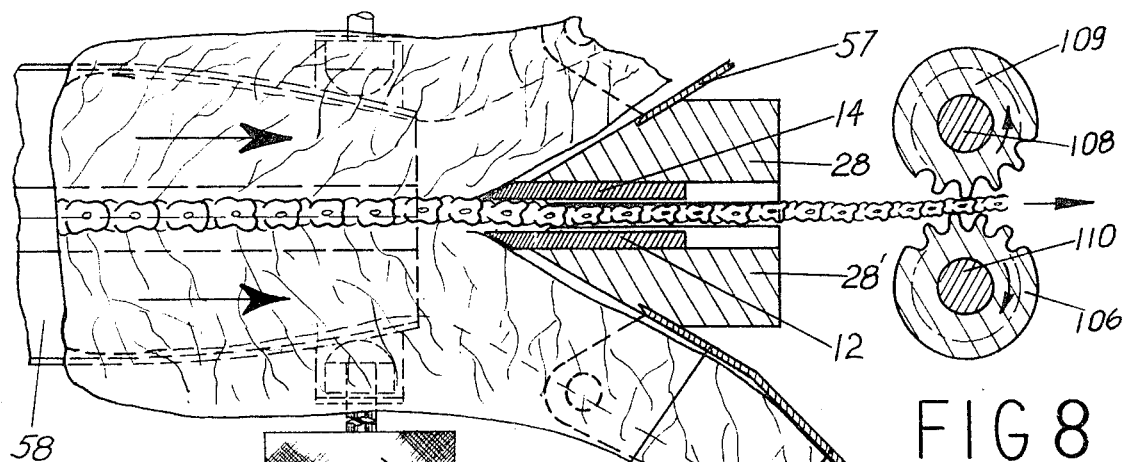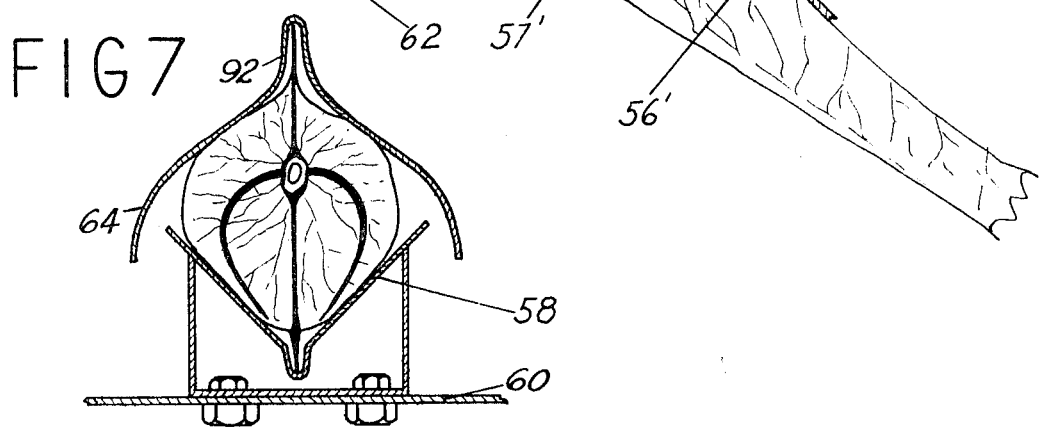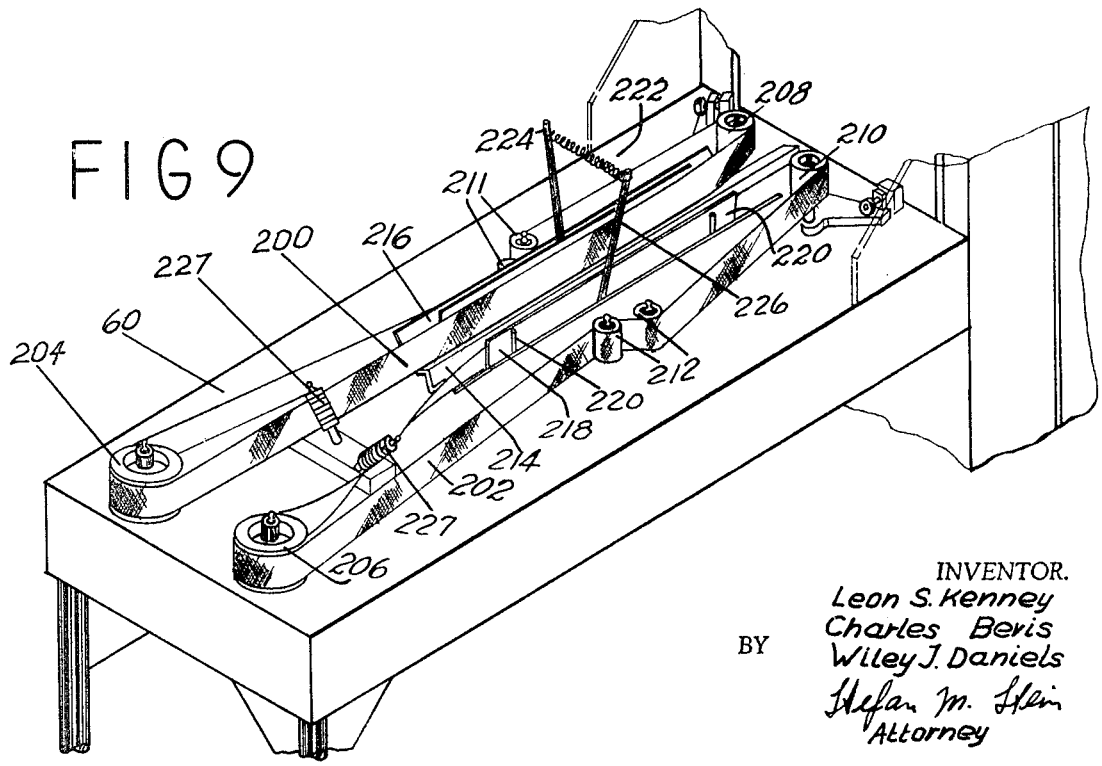

FISH-FILLETING APPARATUS

This invention relates to an apparatus for filleting fish.

In order that fish fillets may be economically marketed, a fish must be filleted by a machine rather than by hand which is time consuming and often inefficient. Present filleting machines usually utilize a pair of rotary disc blades or bandsaw blades. Axiomatically, the primary object of these machines is to fillet a maximum amount of fish flesh without cutting into the bones of the fish.

Unfortunately, present filleting machines still leave an undue amount of flesh on the fish skeleton after the fish is filleted because of several objectionable features. One objectionable feature is that the blades of present machines cannot be easily and quickly adjustable relative to each other to define a fish-receiving opening which conforms to the particular bone structure or skeleton of the fish, yet be sufficiently flexible to ride between and over the bones of the skeleton. An opening which conforms to the skeleton of the fish, together with the blade flexibility is necessary to insure a maximum amount of flesh will be filleted without cutting into the skeleton. In U.S. Pat. No. 1,728,254 a filleting machine is shown in which the blades have an opening substantially conforming to the skeleton of the fish. However, the blades are staggered relative to one another. This is undesirable as staggered blades have a tendency to twist the fish as it is being cut. Further, the cutting edges of the blades are not flexible relative to each other to enable them to ride over the skeleton.

Another objectionable feature of present filleting machines is that presently there is no adequate means to readily center the fish to the blades. This is necessary to insure that for such fish being filleted the blades will cut the fillets equally on each side of the skeleton. Still another objectionable feature is that presently there is no adequate provision to prevent a fish from twisting as it is engaged by the blades. When a fish twists as it encounters the blades, the blades either cut into the skeleton or cut unduly into the fish's flesh. Thus, either undesirable bones are left in the fillets or the fillets are cut inefficiently.

A further objectionable feature is that the machines themselves do not have a provision to easily accommodate fish of different sizes. Usually extensive modification or adjustment is necessary. Still further objections are that present fish-filleting machines do not have an adequate conveying means to convey the fish between the blades while it is being filleted or to move the fish to the blades. Most machines have a conveyor which grips the side of the fish while moving it through the blades. This is undesirable as it compresses the fish against the blades and impedes the blades' cutting action. Also, present machines usually do not have an adequate means to separate the filleted fish from the skeleton such that the fillets may easily be deposited in individual containers. Attempts have been made to correct these objectionable features, but to date have been unsuccessful.

Accordingly, it is an object of this invention to provide a fish-filleting apparatus which will fillet a maximum amount of fish flesh without cutting into the bones of the fish.

Another object is to provide a fish-filleting apparatus with bandsaw blades that can easily be adjusted to define a fish-receiving opening that conforms to the angle of the backbone and rib cage of the fish being filleted.

Still another object is to provide a fish-filleting apparatus with flexible bandsaw blades that are adapted to ride over and conforming to the outer surfaces of the bones of the fish being filleted.

A further object is to provide a fish-filleting apparatus having means to center the fish and prevent it from twisting as it is being filleted.

A still further object is to provide a fish-filleting apparatus which fillets the fishtail first and which has means to center the tail as it approaches the filleting blades.

Another object is to provide a fish-filleting apparatus with band saw blades that move downwardly as they cut the fish to assist in stabilizing the fish as it is being filleted.

Another object is to provide a fish-filleting apparatus which can accommodate fish of different sizes.

A still further object is to provide a fish-filleting apparatus which fillets fish rapidly yet effectively.

Another object is to provide a fish-filleting apparatus which has means to draw the fish between a pair of filleting bandsaw blades without pressing the sides of the fish against the blades.

Another object is to provide a fish-filleting apparatus which has means to direct the fish fillets away from the skeleton as the fish is filleted so that they may easily be deposited into separate containers.

Still another object is to provide a fish-filleting apparatus with a conveyor for conveying the fish to be filleting station.

Another object is to provide a fish-filleting apparatus which is practical and economically feasible to manufacture.

Other objects of the invention will in part be obvious and will in part appear hereinafter.

In accordance with these objects, the invention comprises a fish-filleting apparatus having a pair of oppositely rotating bandsaw blades which fillet a fish as the fish is passed between the blades, tail first. The blades ride within slots on guide blocks which are adjustable to conform the opening of the blades to the bone skeleton of the fish being filleted. To cut close to the bones of the fish's backbone without cutting them, the blades are spring biased toward each other to ride over but in close uniformity to the outer surface of the bones. The cutting or leading edge of the blades are also beveled outwardly to cut extremely close to the skeleton. A V-shaped trough upon which the fish rides, in a faceup but tailfirst position, acts to center the fish as the fish is presented to the blades. The forward end of the trough is preadjusted to the size of the fish being filleted to cause a squeeze-in of the rib cage so that the flesh immediately behind and even around the cage can also be recovered. Centered over the trough at its forward end is a hood having a U-shaped channel along its top to further center and guide the fish and especially to properly present the tail to the blades. The hood being tilted forwardly, also forms a forward opening with the trough that is smaller than the height of the fish. This forward end of the hood is spring biased downwardly such that as the fish passes through the opening, it lifts the hood. The spring tension acting through the hood thereafter rigidly centers and supports the fish to prevent it from twisting as it is filleted. To further retain the fish against the V-shaped trough and prevent it from twisting, both blades move downwardly as they fillet the fish. The fish is pulled through the blades as it is being filleted by a pair of rollers which initially engage the tail of the fish and thereafter the body's skeleton. As the fish is filleted and pulled through the blades, a fillet guide directs the fillets away from the skeleton whereby they may easily be deposited into separate containers.

For a fuller understanding of the nature and objects of the invention, reference should be had to the following detailed description taken in connection with the accompanying drawings in which:

FIG. 1 is a perspective view of the fish-filleting apparatus of the instant invention showing the operating elements partially exposed, FIG. 2 is a front sectional view taken along lines 2-2 of FIG. 1, FIG. 3 is a rearward perspective view of the apparatus showing the operating parts partially exposed, FIGS. 4, 5, and 6 are diagrammatic views illustrating the manner in which the fish is supported as it approaches the blades and is being filleted, FIG. 7 is a cross-sectional view taken along lines 7-7 of FIG. 5, FIG. 8 is a top sectional view taken along lines 8-8 of FIG. 6.

FIG. 9 is a perspective view of an alternate embodiment of fish transport means to the blades.

SImilar reference characters refer to similar parts throughout the several views of the drawings.

Referring now to the drawings in detail, in particular FIGS. 1 and 2, there is illustrated a fish-filleting apparatus having an upright frame 10 upon which is rotatably mounted a pair of bandsaw blades 12, 14. The band blades 12, 14 are each arranged to respectively run over a pair of pulleys 16, 17 and 18, 19 mounted in suitable bearings on the machine frame. Pulleys 16, 17 and 18, 19 are preferably arranged side by side to cause adjacent portions of the bandsaw blades 12, 14 to run in substantially parallel planes spaced a short distance apart.

A fish is filleted during the operation of the machine by feeding the fish against the cutting edges of the blades. The leading or cutting edge of each blade is beveled, as best seen in FIG. 8, with the bevel 15 flaring outwardly and leading away from the backbone of the fish. Such outward beveling of the leading edge of each blade aids in moving the blade over the bones while cutting the flesh immediately adjacent thereto. Pulleys 16, 18 are respectively operatively connected to motors 20, 21 by pulley belts 22, 23, (FIG. 3). Motors 20, 21 rotate the blades in opposite directions as shown by arrows 24 so that the blades both move downwardly as they fillet the fish. Such downward movement is beneficial in that the blades do not tend to twist the fish as they cut, but rather assist in retaining the fish in the support trough hereinafter described.

Provision is made to position the blades such that the opening between them conforms to the bony skeleton of the fish to insure that the maximum amount of flesh from the skeleton is removed without the skeleton itself being cut by the blades. With this provision, the fillets are cut along both the fish's backbone and rib cage. This is accomplished by substantially identical components which both guide and adjust the blades relative to each other. They include a pair of upper guide blocks 26, 26 and a pair of lower guide blocks 28, 28, each of which has a guide slot adjacent its free end for containing and guiding the respective bandsaw blades 12, 14. The guide slot is formed in the near surface, as viewed in FIG. 2, of each guide block by milling the slot or by fastening to the end of each block a recessed end piece. Upper guide blocks 26, 26', are respectively attached to guide pins 30, 30', and lower guide blocks 28, 28 are respectively attached to guide pins 32, 32'. Each guide pin guides and directs the angle of the guide block to which it is attached. The free ends of guide pins 30, 30' extend through and freely ride in respective guide pin apertures 34, 34' in guide pin support brackets 36, 36' which are secured to the frame 10. Similarly, lower guide pins 32, 32' respectively ride in apertures 38 and 38' in guide pin support brackets 36, 36'. Guide pin apertures 34, 34', 38, 38' have a width slightly larger than the guide pins to allow them to slide freely therein but without excessive play. The apertures are elongated vertically to enable guide blocks 26, 26', 28, 28', to be inclined with respect to the vertical axes, whereby they may be adjusted to the skeleton outline of the fish as shown in FIG. 2.

To move the guide blocks relative to each other and thereby adjust the width of the fish-receiving opening between the blades, 12, 14, an identical adjusting linkage is provided for each guide block. The linkage comprises a clamp 40 affixed to each guide pin 30, 30', 32, 32'. Clamps 40, 40' are each pivoted to cross braces 42, 42' which in turn are pivoted to adjustable bracket 44, 44' clamped to vertical rod or axle 46, 46' respectively seen in FIG. 2. Each guide block is independently, laterally adjusted by varying the angle at which its corresponding bracket 44, 44' is clamped to the appropriate axle 46, 46'. Axles 46 and 46' are in turn respectively pivoted by pivot levers 48, 48'. A spring support arm 50, 50' is respectively attached to levers 48, 48' for supporting a spring 52 which extends between arms 50, 50' to bias them toward each other. Because spring support arms 50, 50' are biased toward each other, pivot lever 48 tends to pivot counterclockwise and lever 48' clockwise. When these pivot levers pivot in this direction, guide blocks 26 and 28 for blade 14 and guide blocks 26', 28' for blade 12 simultaneously move toward each other. To limit the inward movement of the guide blocks an adjusting setscrew 54, 54' (FIG. 2) extends respectively through each pivot lever 48, 48' and bears against frame 10. It should be obvious that by adjusting set screws 54, 54', the distance between respective guide blocks 26, 28 and 26', 28', corresponding to the opening between the blades, may be regulated or adjusted.

To guide and separate the fillets as they are being cut by the blades 12, 14 and to direct the fillets into separate containers after they are cut, a pair of vertical, fillet guides 57, 57' (FIG. 3 and 8) are attached respectively at each end to guide blocks 26, 28 and guide blocks 26', 28'. These fillet guides flare outwardly at 56, 56' (see FIG. 8) to direct the fillet after being cut.

To guide the fish through the blades tail first, a V-shaped trough 58 is attached to table 60 (see FIG. 1). The longitudinal centerline of the trough lies in a plane which passes midway through the two blades 12 and 14. The V-shape of the triangle conveniently enables use of the apparatus with fish of different sizes. Trough 58 extends forwardly to a point immediately adjacent blades 12, 14. At this point, a trough-adjusting bolt 62 is provided on each side of the trough which bears against the side of the trough 58 and is adapted to move that side inwardly or outwardly to control the width of the trough at its forward end. This width is adjustable so that the portion of the fish which is in the trough will be slightly compressed and held rigidly as the fish is filleted.

To further assist in centering the fish to the blade opening and to prevent it from twisting while being filleted, provision is made to center the tail of the fish and to clamp or compress the fish to the trough as the fish approaches blade 12, 14. This provision is best seen in FIG. 1 and 4 to 7. A hood 64 is pivoted at each side of its rearward end about pivot pins 86 (only one shown) mounted on brackets 88 attached to table 60. Each bracket 88 is vertically adjustable by a setscrew 90 (FIG. 1) to vary the height of pin 86 and consequently hood 64. Hood 64 is centered to and overlays trough 58. To receive, guide and center the tail and back fin of the fish, a relatively narrow channel 92 with an extended opening 93 at the rear end is provided along the top of the hood. The channel extends forwardly (see FIGS. 4—6) between the blades such that as the tail passes between the blades, it will be exactly centered. The hood in combination with trough 58 produces a fish-receiving opening which gradually reduces from front to rear to compress the fish as it is fed to the blades 12 and 14.

For biasing the forward end of the hood downwardly, hood 64 (FIG. 1) is connected to a bracket 94 that is pivoted to brace 96 which in turn pivoted to a sliding block 98. Sliding block 98 is slidably mounted on a rod 100 and biased downwardly by a spring 102. Spring 102 is positioned between slide block 90 and a top cross member 104 comprising the top of the two-legged stand 106. The opening between the hood 64 and trough 58 is adjusted such that as the fish is advanced toward the blades, the tail of the fish first enters channel 92 (FIG. 4). The forward fish-receiving opening of the fish first enters channel 92 (FIG. 4). The forward fish-receiving opening of the hood is of a size larger than the body of the fish. As the fish is advanced further into the hood, the tail of the fish flips up into cutout or opening 93 (FIG. 5). Then as the fish is still further advanced, the body of the fish lifts the hood against spring 102 (FIG. 6). Also the sides of the fish are pressed inwardly by the ends of the trough (FIG. 8). As all this occurs, the fish is compressed or clamped between hood 64 and trough 58 and is prevented from being twisted and is rigidly centered to blades 12, 14. Indeed even the rib cage of the fish is compressed, as the fish travels, first from its tail to the head end of the fish, so that the meat just behind the rib cage is even utilized.

To pull the fish between the blades as it is being filleted, there is provided (see FIG. 3) a pair of parallel steel rods 108, 110 rotatably journaled on their ends in bearing blocks 112 and 114. Spur gears 106 and 109 in meshing engagement are keyed respectively to the lower ends of shafts 108 and 110. Shaft 110 is rotated clockwise, while shaft 108 is rotated counterclockwise (FIG. 8) by motor 118 through a reduction gear 120 operatively connected to a driving sprocket chain 122 (FIG. 1 and 2), to rotate a sprocket pulley 124 affixed to the upper end of shaft 110 while gears 106 and 109 intermesh.

Rotatably carried with shafts 108 and 110 are a pair of splined rollers 126, 128. These rollers are parallel to each other but spaced such that there is a small clearance between them centered to the opening of blades 12, 14. As the tail of the fish is presented to the nip of the rollers 126, 128, the rollers thereafter pull the fish skeleton through the blades (see FIG. 8). Shafts 108 and 110 are flexible so that as the skeleton of the fish is pulled through the rollers, the rollers bow outwardly to facilitate their ride over the boney matter of the fish.

To lubricate the blades and assist them in cutting the fish, water or another suitable liquid is supplied from a suitable pump not shown through conduits 130 and 132 (FIG. 3). To facilitate sliding of the fish through hood 64 and trough 94 without undue sticking, another water conduit 134 (FIG. 1) is provided to deposit water on the fish's back as it enters into the hood.

To operate the machine, the machine is first adjusted to the approximate size of the fish being filleted. This is accomplished by first adjusting the angle of the blades at the fish-receiving opening to conform approximately to the skeleton of the fish. That is, the blades will be adjusted to have an inverted V-shaped opening as seen in FIG. 2 such that they will run along the backbone of the fish, yet clear the fish's wider rib cage. To adjust the blades, adjustable brackets 44, 44' and guide blocks 26, 26' and 28, 28' are moved toward each other until the desired blade opening is provided. Clamp arms 44, 44' are then clamped to axles 46, 46' to secure the guide blades in this position. Thereafter, to accommodate small changes in the size of the fish, the guide blocks may be adjusted by adjustment of set screws 54, 54' on pivot levers 48, 48'. To rigidly hold the fish and center it to the blades while it is filleted, sidewalls of trough 58 are then set to the width of the fish by adjusting bolts 62.

Before being filleted, the fish is beheaded. Afterwards, an operator places the bottom of the fish, with its tail toward the blades, on the rearward end of V-shaped trough 58. The operator then advances the fish forwardly. As the fish enters hood 64, its tail first slides into channel 92 on top of the hood. This centers the tail to the center of the opening between the blades. As the fish is further advanced, its tail fin is guided into contact with rollers 126, 128 which thereafter pull the fish through the blades as it is filleted.

It is important to note that as the fish is filleted, it is rigidly centered to the blade opening by being compressed by both the sidewalls of trough 58 and hood 64. This is important because it enables the blades to cut the fillets evenly on both sides of the fish. The rib cage is centered to the blades primarily by the adjustment of width of the forward portion of trough 58. As will be recalled, this width is adjusted to be slightly smaller than the width of the fish. Simultaneously, the fish is also compressed by hood 64.

As the fish is advanced into the hood, the fish lifts the hood against the force of spring 102 because the forward opening of the hood is smaller than the height of the fish. When this occurs, the fish is clamped between the hood and trough 58 to prevent it from twisting and is centered to the blade opening 12, 14.

The blades themselves are arranged to come into contact with the outer surface of the fish's skeleton as the fish is filleted. Because the blades are beveled with the leading edge extending away from the bone skeleton, and because the blades are adapted to flex outwardly against spring 52, the blades cut the fillets very close to the skeleton. Thus, a maximum amount of flesh is removed.

It is important to note that unlike previous machines no lateral pressure is applied to the sides of the fish adjacent the blades while it is being filleted. This facilitates the blades'-cutting action because the sides of the fish are not pressed against the blades.

Conveniently, the fillets are directed away from the skeleton by fillet guides 56, 56'. This enables the fillets and bone skeleton of the fish to be easily deposited into separate containers, not shown.

As shown in FIG. 9, the apparatus can be provided with a belt conveyor for conveying the fish to the blades. The belt conveyor is mounted on table 60 and replaces trough 58. The other elements of the apparatus are the same function as previously described. The conveyor comprises a pair of endless belts 200, 202 carried about pulleys 204, 206 at the rear end of the table. Belts 200, 202 are rotated by pulleys 204, 206 driven by suitable motors lying beneath the table. Belts 200, 202 are respectively carried about the belt-tensioning pulleys 211, 212 which adjusts the tension in the belts in the customary manner.

The inner length of the belts 200, 202 ride within a staggered V-shaped trough 214 attached to table 60 and which extends forwardly to a point immediately adjacent blades 12, 14. The trough has a lower V at its bottom extending outwardly and upwardly into diagonal sidewalls 216. An adjustable bearing plate 218 is pivoted to each diagonal sidewall and is adjustably supported by pins 220 such that the plates may be regulated to the width of the fish. The inside length of belts 200, 202 are led by guide rollers 227 such that they bear against the inside face of bearing plates 218. Bearing plates 218 are biased toward each other by a spring 222 stretched between poles 224 and 226 operatively connected to the bearing plates. The opening between the bearing plates 218 is slightly smaller than the width of the fish being conveyed such that as the fish passes between them, they are sprung apart to cause belts 200, 202 to firmly grip the fish.

In utilizing the belt conveyor, the operator places the bottom of the fish tail first on the lower V of the staggered V-shaped trough 214. The fish then comes into contact with conveyor belts 200, 202 which carry the fish forwardly into hood 64, and thereafter between blades 12, 14. The fish is filleted in an identical manner as theretofore been described.

It should now be evident from the above description that a novel fish-filleting apparatus has been invented. The blades are easily adjustable to conform to the skeleton outline of the fish and this, in combination with the fact that the blades have an outward bevel and are flexibly biased, enables the fish to be efficiently filleted with a minimum amount of flesh remaining on the fish's skeleton. While being filleted, the fish is prevented from twisting by rotating both of the blades downwardly and by centering and securing the fish to the center line of the opening of the blades with the hood and V-shaped trough. Advantageously, the fish is pulled through the blades as it is being filleted by a pair of splined rollers which further assist in centering the fish between the blades. Moreover, as the fillets are being cut, they are directed away from the bone skeleton of the fish such that the fillets and skeleton may be easily separated and directed into individual containers. With this operation, the machine fillets rapidly, but yet effectively. A beltlike conveyor may easily be adapted to advance the fish into contact with the blades if so desired. Moreover, not of least importance, is the fact that the machine is simply constructed making it practical and economically feasible to manufacture.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, What we claim is:

1. A fish-filleting apparatus which simultaneously cuts fillets on each side of the fish's backbone and rib cage whereby a maximum amount of flesh is filleted without cutting into the skeleton of the fish, said apparatus comprising a pair of rotating blades for cutting and filleting said fish, said opening substantially conforming to the skeleton of the fish being filleted, said blades being laterally, flexibly biased and arranged to ride over said skeleton of said fish, said fish being delivered tail first to said fish receiving opening, the apparatus further comprising fish centering means which includes a V-shaped trough for supporting the bottom and lower sides of said fish, a hood overlaying said trough and defining a fish receiving opening therebetween, said hood being biased downwardly at its forward end and arranged to be raised by said fish, such that said raised hood clamps and prevents said fish from twisting while being filleted.

2. The apparatus of claim 1 wherein said fish-centering means includes a tail fin guide adapted to receive the tail fin of said fish and center said fin to said blade opening.

3. The apparatus of claim 2 wherein said tail fin guide comprises a channel disposed along the top of said hood, said channel extending between said blades, and wherein a portion of said trough is adjustable to conform to the width of the fish being filleted.

4. The apparatus of claim 1 wherein both of said blades move downwardly as they fillet said fish.

5. The apparatus of claim 1 wherein said blades have a cutting edge which flares away from the backbone of the fish being cut.

6. The apparatus of claim 1 wherein transporting means are provided which pull the skeleton of said fish through said fish-receiving opening between said blades.

7. The apparatus of claim 6 wherein said transporting means includes a pair of parallel rollers centered vertically behind said blade opening, and said rollers being flexible relative to each other and adapted to initially engage the tail of said fish and thereafter pull the skeleton of said fish through said fish-receiving opening between said blades.

8. The apparatus of claim 7 further including a fillet guide located forwardly and adjacent each blade for separating the fillets while being cut, and for guiding the fillets outwardly from said blades.

9. The apparatus of claim 1 further including adjusting means for adjusting said blade opening.

10. The apparatus of claim 9 wherein said adjusting means includes upper and lower guide blocks for each blade, said guide blocks slidably retaining said blades, said guide blocks for each blade adapted to be laterally adjusted both independently and mutually and said guide blocks of one blade flexibly biased toward the guide blocks of the other blade to flex outwardly when encountering a bone of said fish while said fish is being filleted.

PO-1050
(5/69)

UNITED STATES PATENT OFFICE
CERTIFICATE OF CORRECTION

Patent No. 3,596,308   Dated January 21, 1972

Inventor(s) Leon S. Kenney

It is certified that error appears in the above-identified patent and that said Letters Patent are hereby corrected as shown below:

Column 4, line 55 delete "The forward fish-receiving opening of the fish first".
line 56 delete "enters channel 92 (Fig. 4)."

Signed and sealed this 23rd day of May 1972.

(SEAL)
Attest:

EDWARD M. FLETCHER, JR.
Attesting Officer

ROBERT GOTTSCHALK
Commissioner of Patents